Oct. 25, 1966  R. L. PROPST ETAL  3,280,410
MULTI-DIRECTIONAL MOLDED SPRING ASSEMBLY
Filed March 3, 1964  4 Sheets-Sheet 4

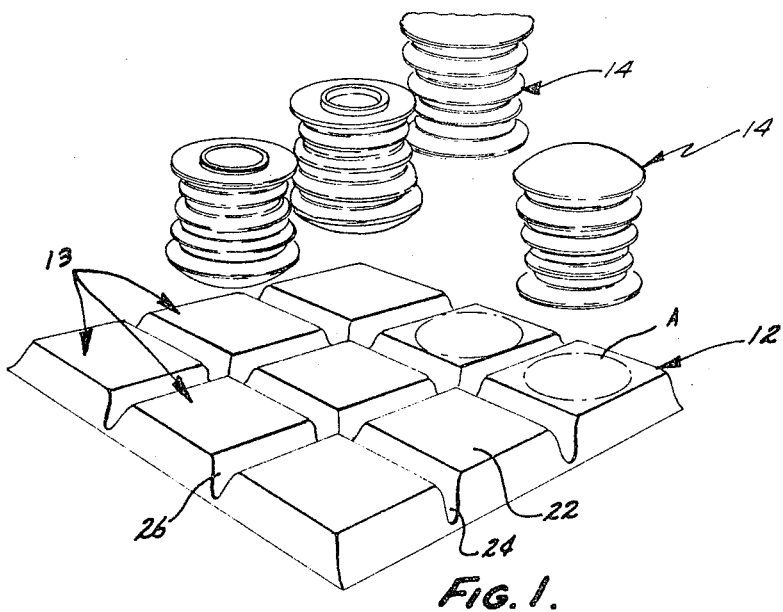
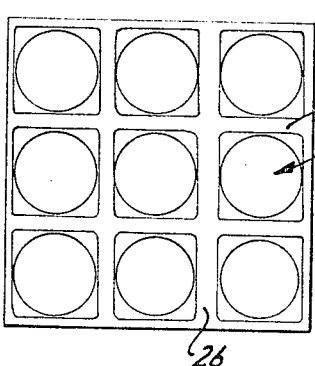
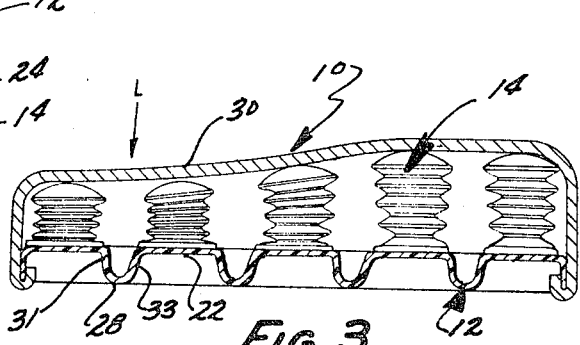
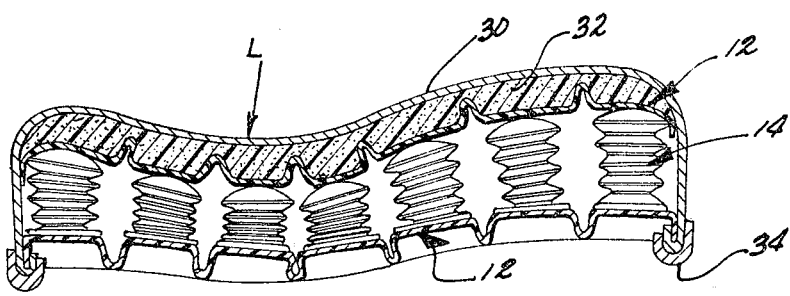

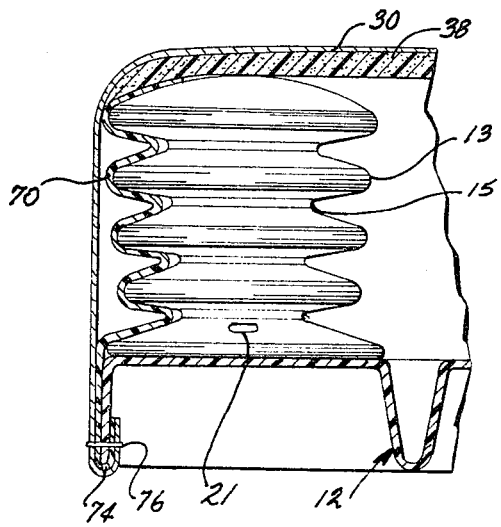
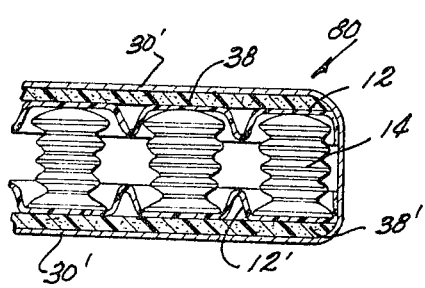
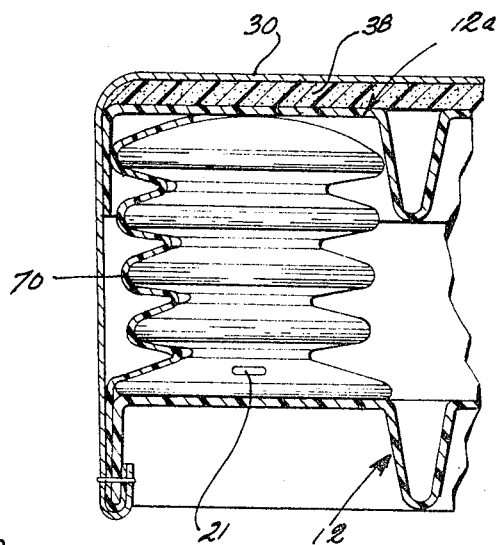
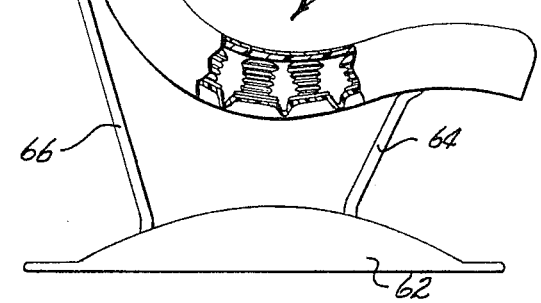

INVENTORS
ROBERT L. PROPST
RONALD H. BECKMAN
BY
*Price & Heneveld*
ATTORNEYS

United States Patent Office 3,280,410
Patented Oct. 25, 1966

3,280,410
MULTI-DIRECTIONAL MOLDED
SPRING ASSEMBLY
Robert L. Propst, 2347 Londonderry St., Ann Arbor, Mich., and Ronald H. Beckman, 27 Bank St., New York, N.Y.
Filed Mar. 3, 1964, Ser. No. 349,102
13 Claims. (Cl. 5—353)

This is a continuation-in-part application of pending U.S. patent applications Serial No. 206,138 entitled Panel Having Multi-Directional Flexibility, filed June 25, 1962, now Patent No. 3,233,885, granted Feb. 8, 1966, and Serial No. 256,376 entitled Molded Body Support, filed February 5, 1963, now abandoned.

This invention relates to a flexible, resilient, load supporting cushion, and more particularly to a resilient bellows spring cushion having controlled flexibility enabling contour forming, optimum comfort, and maximum versatility. It is particularly designed for cushions intended to be curved in one or more planes.

Conventional cushion structures utilizing springs are not capable of bending flexibly as a unit to change in shape or configuration, but are limited to their original manufactured shape. Coil springs are normally tied tightly together to reinforce the structure for stability, thereby preventing flexing. Not only are such structures inflexible as a unit, but usually arch springs are the only type of conventional spring adaptable to contoured, modern style furniture. However, even when employing arch springs, the curvature of seating is definitely limited, and also it is fixed.

Therefore, styles of seating furniture, cushions, mattresses, and related items are limited when springs are employed. Consequently, contoured, modern style furniture is presently largely constructed without conventional springs, except arch springs. Items having large, compound or unusual curvatures are formed using a preformed, contoured shell of wood, reinforced plastic, or metal, covered by a decorative sheet, and usually a foam pad. While this latter construction achieves comfort and aesthetic appeal in many situations, still, the ability to effectively incorporate springs into a contoured furniture item would be extremely advantageous. Without springs, deep soft cushioning can be achieved only with expensive, thick, cored foam material.

Moreover, as is well-known, the cost of molds per se, as well as other molding costs to pre-form rigid contoured plastic or laminated shells is very substantial. For each different configuration, a separate set of molds is required. Thus, the number of articles manufactured from a particular set of molds may actually be quite small in practice, causing the molds to be unproductive over a large portion of their life. Therefore, a spring-type structure that could be mass-produced and later contoured as required would be extremely noteworthy.

Further, when forming spring-type constructions, extensive hand labor is conventionally required if the structure is to achieve quality characteristics such as zonal firmness variation, and proper edge support to prevent a person from sliding off. These last mentioned features are largely impossible to achieve with foam cushioning. When achieved on coil spring constructions, contour forming becomes even more impossible.

It is therefore an object of this invention to provide a resilient cushion spring assembly that can be contour-formed to a variety of shapes and configurations.

It is another object of this invention to provide a spring-containing article of furniture that is actually flexible as a unit, so that its configuration can be modified, e.g. from flat to arcuate or even to a compound curvature in three dimensions. The springs readily conform to different configurations. The number of different possible configurations is large, yet without requiring a plurality of molds. No reinforcement ties or wires are needed between the individual springs to integrate them, to reinforce the edge, or to provide zonal firmness variation.

It is another object of this invention to provide a flexible spring cushion assembly wherein both the springs and the support panel provide cushioning. Controlled flexing and resilience is achieved from a unique, flexible, spring-supporting panel. The panel limits the total deflection to a specific predetermined amount, thereby blending excellent support with optimum comfort.

It is another object of this invention to provide a contoured, flexible spring assembly that permits a wide range of variation in zonal firmness over any portion or all of the structure without necessitating significant manufacturing changes. Moreover, the edge of the article can be imparted with desired controlled support firmness equal to or greater than the remainder of the article, yet without causing discomforting edge rigidity. Both the rate and maximum flexure of the entire assembly during use is pre-set during manufacture and assembly of the springs and flexible supporting panel. Thus, each article may have custom characteristics although assembled substantially on a mass production basis from standard components.

It is another object of this invention to provide a flexible support whose supporting panel has variable, controlled flexibility in selected zones causing it to assume a predictable configuration when pre-flexed, to have varying rates of deflection under loads applied to certain zones, and to have pre-set zonal limits to total deflection. The support therefore uniquely blends stability with flexibility for optimum seating comfort. Moreover, the resilient action of the bellows springs combined with the panel can be precisely controlled during manufacture merely by controlling wall thicknesses of critical portions of the springs and/or panel, and during assembly by controlling the spacing and pattern of the components. Consequently, the assembly lends itself completely to zonal control, providing exact pre-selected curvature, with optimum comfort characteristics.

It is another object of this invention to provide a flexible, resilient, load support assembly that is relatively inexpensive to manufacture since units of an almost endless variety of configurations and flexing characteristics can be manufactured from the same basic components that are mass produced from the same set of molds, regardless of the ultimate shape and cushioning features to be achieved. The result is that each item of furniture, while of custom-made quality, is produced at a minimal expense.

These and several other objects of this invention will be apparent upon studying the following specification in conjunction with the drawings in which:

FIG. 1 is a perspective exploded view of the basic components of the novel combination, including bellows springs and a panel of limited but definte flexibility;

FIG. 2 is a plan view of an assembly of the components shown in FIG. 1;

FIG. 3 is a side elevational sectional view of the assembly showing a small load applied to one side;

FIG. 4 is a sectional elevational view of a modified form of the assembly showing the unit flexing under a substantal load;

FIG. 10 is a fragmentary sectional elevational view of an assembly employing a peripheral girdle band for edge reinforcing and spring retention;

FIG. 11 is a fragmentary, sectional, side elevational view of a modification of the assembly in FIG. 10;

FIG. 12 is a side elevational partially cutaway view of a contoured chair formed with the novel assembly;

FIG. 15 is a fragmentary sectional elevational view of a sandwich cushion modification of this invention.

Figure 5:
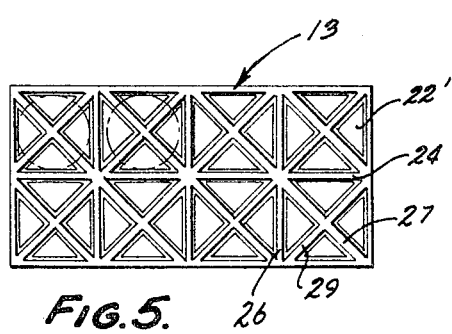
FIG. 5 is a plan view of a portion of a modified panel for the assembly.

Basically, the invention centers around a novel combination of a plurality of hollow, vented, resilient bellows springs mounted in a pattern on at least one panel having definite, limited flexibility, formed of a plurality of adjacent, interconnected, generally flat means having rigid tops, separated by integral intersecting grooves, the floors of the grooves comprising a plurality of flexible resilient hinges in a plane spaced from the plane of the mesa tops or decks. Additional features will be explained with reference to the drawings.

In FIG. 1, the two basic components of the inventive combination are shown, including flexible support panel 12 and hollow vented resilient bellows springs 14.

Each bellows spring is formed of a series of adjacent individual bellows integrally connected at their smaller diameter portions. Each bellows includes a hinge, preferably arcuate in configuration, at its outer extremity where the outwardly converging legs of each bellows form a juncture. Preferably, the bellows springs are formed by blow-molding a parison, due to the advantageous physical characteristics of blow-molded plastic.

The interconnected column of bellows in each spring is preferably tapered from one end to the other, and if desired, can include an enlarged bellows adjacent the smallest bellows to provide optimum stability.

Each bellows spring is molded of a resilient polymer having sufficient resilience and memory to be compressed repeatedly, and to return upon removal of the compressing load, without significant permanent set. Suitable materials for these bellows include the preferred low density polyethylene, or other olefins, and include a polymer of ethylene and ethyl acrylate mixtures, or a mixture of propylene and polyisobutylene polymers.

The height and diameter of the springs can be widely varied depending upon the result desired and the article involved. The total amount of deflection of each spring is dependent upon the number of bellows in each spring and the angular separation of the two legs in each bellows. Optimum separation of these legs is normally at least about 50° for maximum flexure, and because the blow-mold cavity to form the outer hinge tends to receive insufficient polymer if the angle is smaller.

The compression characteristics of each spring are controlled by varying the wall thickness, since this determines the thickness of the bellows hinges. Wall thickness is controlled by introducing more or less plastic in the parison introduced into the mold. As is characteristic of annular blow-molded articles, the wall thickness decreases as the radial distance outwardly from the parison increases. As a consequence of this factor, the thinnest wall is found at the outer junctures 13 of the legs of each bellows in a spring. These outer junctures 13 (see FIG. 10) are preferably arcuate in cross-sectional configuration, as previously mentioned, for several reasons. Fiber stress is kept to a minimum with the arcuate configuration since flexure occurs over the entire arc. Also, the bellows interact to produce a multiple effect with greatly increased support when bellows having arcuate hinges are intermeshed by internesting the springs. Also, this causes a spongy "bottoming" action with complete compression of the spring, as opposed to an abrupt bottoming when the bellows have a sharp outer apex. This is due to the fact that the deflection occurs over the entire arc rather than being concentrated at one point, and also that the blow-molded plastic can penetrate an arcuate mold recess to a greater extent than a sharp mold crevice.

The polymer about the inner junctures 15 between adjacent individual bellows in a spring deflect only under maximum load, and then only partially, due to their greater wall thickness. Thus, when an individual spring is compressed, it has an initial soft compression as the outer hinges flex, and then a second, more resistant compression under a greater load as the thicker material around the inner junctures flexes.

Each bellows spring is hollow, forming an interior chamber. This chamber is purposely freely vented to the atmosphere outside of the bellows spring through suitable vents 21 (FIG. 10). Thus, no pneumatic effect significantly hinders the mechanical, resilient bellows action.

The preferred tapered structure of the individual springs achieves two advantages. Firstly, intermeshing is readily achieved by inverting some of the springs and allowing others to remain upright. It has been found that optimum stability is thereby achieved. Secondly, the inner diameter portions or junctures between the individual bellows, which have a greater wall thickness, do not accumulate one directly upon the other when compressed, but rather are radially spaced, so as to not unduly limit the degree of deflection of each spring. Instead of the tapered configuration, the bellows springs may be generally of the same diameter over their length. Also, it will be realized that, instead of the circular cross-sectional configuration, the springs may be of polygonal or ovular cross-sectional configuration.

The panel 12 resembles a waffle in configuration, having a plurality of flat areas of rigidity 22, separated by intersecting grooves 24 and 26 (FIG. 1). The side walls of the areas 22 are also the side walls of the grooves, with the floors 28 of the grooves comprising integral, resilient hinges (FIG. 3). The hinges are off-set vertically from the plane of the rigid areas. The panel is in essence formed of a series of integrally interconnected mesas 13 having generally flat upper surfaces forming plateaus or decks 22, and relatively steep side walls. The mesas are hollow and substantially rigid such that, viewed from the opposite side, they comprise a series of open pans interconnected across the upper ends of their side walls by flexible connecting webs. These webs also form the bottoms of the troughs 24 and 26, of course, and form the hinges between the mesas. It will be realized that the tops of the mesas may be somewhat convex, but are preferably completely flat to effect the necessary rigidity in an optimum manner.

The grooves 24 and 26 form a plurality of hinges, enabling some rigid areas to be flexed with respect to others in three dimensions. This allows the panel to be formed into a variety of configurations and shapes involving both simple and compound curvatures.

The plurality of flat, non-flexible rigid plateau surfaces 22 collectively form one face of the panel, while the crowns or floors of the grooves collectively form another face of the panel. The two faces are spaced in separate parallel planes. Described differently, the panel is formed of a series of pans having depending side walls, interconnected by flexible resilient webs 28 functioning as hinges. The rigid areas give the panels strength, and because of their shape as a pan, provide a significant moment of inertia. They are too small and thick in relation to their depth to wrinkle or twist under shear loading. Thus, this panel provides sufficient thickness to have a significant moment of inertia, yet one capable of compound curvature, without formation of undesirable shear-wrinkles.

The complete panel may be integrally formed by molding, using materials such as a polyvinyl, e.g., polyvinyl chloride, a polyester, polystyrene or other polymers, and co-polymers. Various types of reinforcing fibrous materials may be added such as filamentary glass or nylon, either woven or in random condition. Other materials can obviously be used for this purpose. The materials recited above are to be considered as exemplary only, and not to be a limitation upon the scope of this invention.

The panel, manufactured by molding or vacuum forming, or other equivalent methods, may be produced on a mass production basis in its over-all flat configuration. Particular deflection and stiffness characteristics can be introduced into the basic panel merely by varying size and proportion of the pans, as well as varying the wall thickness of the hinge elements. The effects resulting from panel stiffness variations are many.

Further, maximum deflection of the panel under load before the pans "lock-up" can be controlled by varying the spacing between the walls 31 and 33 of each groove (FIG. 3), i.e., the width of the groove floor, or by the degree of divergence of the walls. When the panel is deflected sufficiently to cause these walls to abut, further deflection cannot be achieved in this area or zone of the panel. This zone is then in "lock-up" (see e.g. FIG. 4). By varying this groove width over zones of the panel maximum deflection of each zone can be different, thereby providing the complete panel with characteristics that will produce a desired panel configuration under complete panel lock-up.

Not only can the degree of deflection between increments be controlled, but their rate of deflection in proportion to the load applied can also be regulated. This is chiefly done by control of the groove thickness, especially of the floor. Material selection will also provide variable resistance to flexure. Zonal rate of flexure is achieved by varying hinge thickness over zones of the panel, with the number of pattern variations being almost without limit. Consequently, by varying the separation between hinge walls of the panel, the resiliency of the material of which the panel is made, and the thickness of the hinge, complete control is achieved over its configuration reaction under load, total flexure, rate of flexure, zonal flexure and shape under load.

In addition to the panel being subject to variation in width of the grooves during manufacture, a supplemental snubber strip of chosen width can also be inserted and adhered within any one or more of the grooves to limit maximum deflection of that portion of the panel in one or more dimensions.

All of these variations in the panel to achieve zonal control concern the actions of the hinges, since these are the moving operative elements. Almost all of the flexing occurs at the arcuate apex of the hinges, i.e. the floor of the grooves, although sometimes the sides of the channels, i.e. the walls, flex a minor amount in addition to flexing at the apex. Basically, control of the resilient hinges of the panel is essential. It will be readily appreciated that the grooves in the panel may be at various angles with respect to each other to achieve various flexing action in chosen dimensions. The parallel arrangement of the grooves is exemplary of only one angle.

Also, the generally square pan-shape may be replaced by some other polygonal, circular, or ovular configuration. Moreover, the flat areas of rigidity could conceivably be somewhat concave, convex, or some variation thereof as long as its rigidity in these spaced increments is not sacrificed. Modifications to achieve the result desired and employing the principles explained are almost endless within the skill of the designer and plastics engineer, once the invention herein is understood. Consequently, these obvious modifications on the general theme presented are all part of the broader inventive concept taught herein.

From a combination of the bellows springs with this type of panel, articles of seating or other usage are provided with optimum comfort characteristics, and configurations of any compound curvature to suit the style and aesthetic effect desired. The resulting product provides excellent support, while still enabling flexibility of controlled characteristics and maximum deflection, as well as resiliency and memory to return to the initial configuration once a load is removed.

In the figures illustrated, various forms of the inventive combination are depicted to teach the broad principles of the combination in a few specific embodiments. Once these are understood, many additional variations will readily become apparent. A complete showing of all variations is completely impractical, if not impossible.

In FIG. 1, bellows springs 14 are shown raised above their respective mounting positions (shown in phantom lines A) over the flat rectangular areas of rigidity 22. The springs can be suitably attached to the panel by a variety of known methods such as heat sealing, adhering, stapling, tufted tie-down strings, or some other method, depending on the production methods employed, ultimate use, and aesthetic effect desired.

In FIG. 2, springs 14 are shown in plan as mounted on panel 12 to more specifically illustrate their pattern orientation coincident with the flat rigid deck areas 22.

In FIG. 3, a complete assembly is shown, including panel 12, a plurality of bellows springs 14 mounted on the flat incremental areas, and a flexible cover sheet of plastic or cloth 30. The exposed upper ends of the springs and the sides are enveloped by the sheet, which is secured around the outermost edge of panel 12 by heat sealing, stapling, or the like.

Upon the occurrence of a small load on the assembly (as illustrated by the arrow in FIG. 3), the bellows springs compress in the area of the load concentration and adjacent areas forming the zone of reaction. The cover sheet is flexible but not stretchable, to thereby distribute some of the load over several springs in a zone of reaction. Under light load, the panel may be sufficiently rigid to withstand flexing (as shown) if desired.

The specific assembly formed from the basic components can be widely varied. For example, the panel 14 can be used on both the top and bottom as suggested in FIG. 4. Both panels may be upright (as the lower one) or inverted (as the upper one). The lower panel 12 has a limited maximum deflection under load, in this instance, to control total article flexure. The hinges in the lower panel deflect under a substantial load (see arrow L) to cause the hinge walls in the area of maximum deflection to abut. The hinges "lock-up," one at a time, radiating outwardly from the point of load concentration. The number of hinges locked up depends upon the load applied. This determines maximum deflection. The decks 22 of the upper panel 12' are shown in alignment with the upper ends of the springs. The upper panel and springs may be secured together as by heat sealing, adhesives, stapling or the like.

Overlying the upper panel is a foam pad 32 with protrusions shaped to fill the pockets of the inverted "pans" of the panel, and form a continuous upper seating surface. The foam pad may be preformed or foamed in place. A decorative cover sheet 30 extends over this pad, around the edges of the article, and around the lower outer edge of the lower panel, where it may be secured by suitable strip fasteners 34. The foam pad prevents feel of the upper panel, or visible telegraphing of the panel outline through the cover sheet.

The total zone of reaction of a panel under load extends over a substantial area. This is due to compression of several adjacent bellows springs around the concentrated load, but in decreasing amounts away from the point of load concentration. The springs also tip to smoothly conform to the changing shape. Simultaneously, several of the panel hinges deflect, but also in decreasing amounts away from this point of concentrated load. If the load is very large, the hinges in the entire panel may lock up.

The assembly provides form-fitting characteristics of an optimum nature, controlled by the wall thickness of the bellows, the number of bellows in each spring, the pattern and spacing of the bellows over different zones, the wall thickness of the hinges in panel 12, the clearance between the walls of each hinge groove in the panel in various zones, and the number of hinges and deck areas in the panel or panels. The potential number of variations possible is extremely large and practically infinite.

Although the preferred form of the panel 12 employs grooves which are parallel with each other and arranged in two different groups, with the grooves of one group being perpendicular to those of the second group, this particular arrangement of grooves, and the resulting shape of the rigid plateaus is not essential. For example, referring to FIG. 5, the panel 13 includes triangular areas 22, separated by grooves which not only include the parallel and perpendicular grooves 24 and 26, but also diagonal grooves 27 and 29. Compound curvatures achieved with such a structure are smoother in configuration than those formed with square or rectangular rigid areas. This of course also changes the resilience and total deflection characteristics. Other conceivable configurations in addition to the triangular or square ones illustrated are also within the scope of this invention as mentioned previously. It is also possible that the grooves be arranged at an angle to the sides of the panel such as would be the case if the grooves 24 and 26 were eliminated from panel 13 (FIG. 5).

Figure 6:
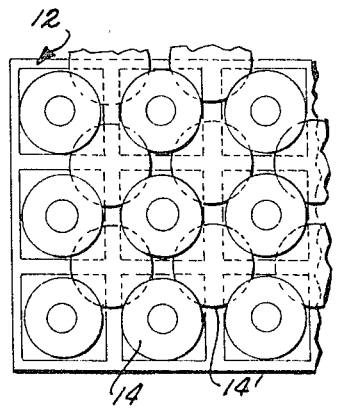
FIG. 6 is a fragmentary plan view of an assembly modification showing the bellows springs intermeshed with each other on the panel.
Figure 7:
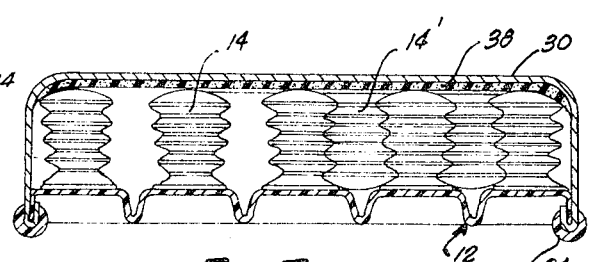
FIG. 7 is a side elevational sectional view of the spring assembly in FIG. 6 with a flexible cover means.

Experimental with the bellows springs has shown that it is often desirable to intermesh the bellows of adjacent springs as illustrated in FIGS. 6 and 7, since a "multiple" cushioning action results. This action causes the total support provided by the article to be far greater than the sum total of the independent support of each spring. By mounting a plurality of bellows springs 14 on the flat deck areas, and a second series of springs 14' between them in an inverted position, the individual bellows can be intermeshed. If a load is applied to selected ones of intermeshed springs, the force is actually transmitted laterally between the springs at all vertical levels of the springs, thereby effecting a cooperative load distributing action. The legs of the intermeshed bellows are forced tightly together under compression. Also, the arcuate outer hinge junctures are squeezed to constrict the freedom of movement of the arcuate area in the groove of the adjacent springs. When the springs are axially compressed, the bellows must expand radially outwardly. To do this, the legs of adjacent bellows must slide together against frictional forces. Also the bellows must be bulged into the cooperative groove. Consequently, the greater the compression of the spring, the greater must be the next increment of force to compress it further. The result is the multiple-action effect causing the springs to act as a unified whole.

Zonal control of firmness and resiliency is achieved by the degree of intermeshing of adjacent springs, as well as the panel variations previously discussed. Normally, the bellows are not completely intermeshed, since if the outer juncture of one bellows abuts the inner juncture between adjacent bellows on the adjacent spring, compression of the bellows would be prevented because the bellows could not radially expand. The individual bellows of the intermeshed springs must expand radially outwardly when axially compressed. Consequently, control of maximum deflection of springs in any zone is readily achieved by governing the degree of intermeshing. Another method of controlling spring deflection in a zone is to control the compression characteristics of the hinges in an individual spring. This is achieved by varying the hinge wall thickness or by employing particular polymers, or both. Thus, with proper spring placement over the panel, and selected intermeshing, exact zonal control is readily achieved.

When the springs are mounted in the alternate upright-inverted relationship shown, only the upright springs need be secured to the panel. All of the springs are preferably secured to the overlying foam pad 38 by heat sealing or adhesives. This pad thus serves as an anchor, as well as preventing "feel" of the springs through the cover sheet 30. Further, the pad eliminates visible telegraphing of spring outline through the cover sheet. Again the cover sheet may be attached around the edge of panel 12 with trim strips 34. The assembled product is flexible and compressible like the other modifications.

Figure 8:
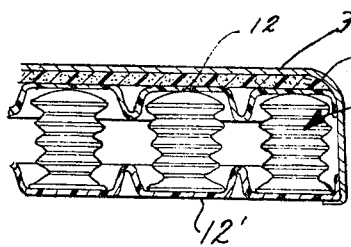
FIG. 8 is a fragmentary, side elevational, sectional view of a further modified assembly incorporating two of the flexible panels.

In FIG. 8 is illustrated a form of the invention incorporating two of the panels, with the ends of the bellows springs being retained in the open pans between the side walls and hinges. By so doing, the springs are retained against any side shifting whatever. Assembly is simple, since the springs are always in the correct location. It will be noted that the upper panel 12 will determine maximum deflection since its hinges will "lock-up," while those of lower panel 12' will not. Normally, therefore, the hinges of the lower panel will be of heavier construction to properly support the springs, yet with some degree of flexibility. The upper panel prevents "feel" of the springs by the user, and prevents telegraphing of spring outline through the cover sheet 30. A foam pad 38 is preferably used over the upper panel to prevent telegraphing of the panel ridge outlines, and to eliminate any pinching of the user by the hinges as they close under load.

Figure 9:
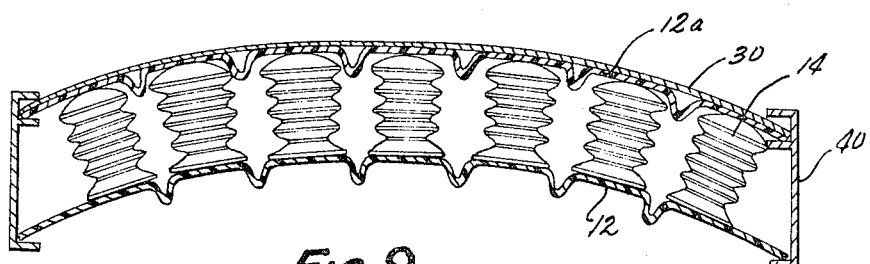
FIG. 9 is a side elevational sectional view of one form of the inventive assembly shown retained in a contoured condition to provide a predetermined contoured configuration.

In FIG. 9 is shown a pre-shaped article utilizing the novel combination of waffle panel and vented bellows springs. After the waffle panels are manufactured in their flat condition, and the plurality of bellows springs are blow-molded with their chosen configuration, shape and characteristics, they are assembled in a pattern. The composite structure, since it is flexible, can be performed by compressing the sides into almost any specific configuration. It is maintained in this configuration by frame elements, tie elements, or any suitable structural supports of tension or compression type. In the form shown, a peripheral frame 40 includes inwardly protruding flanges to retain the panels in their curved condition. The completed assembly, covered by a decorative sheet 30, is formed from the same mass produced basic components, has definite but limited flexibility under load, has compressibility, and can moreover be re-shaped to any desired configuration to custom fit a particular use. The contouring thus achieved may be simple or compound and may be in more than one direction with respect to the panel. Since both panels 12 and 12a are upright in this modification, both help determine maximum deflection before lock-up occurs. It will be apparent, therefore, that by starting with the same components employed in the other articles shown, the desired convex surface is formed without any special skills or tools whatever.

This simplified contour is merely representative. The possibilities are almost without number. As another example, reference is made to the contoured chair 60 (FIG. 12). The chair includes a suitable base 62 and upright supports 64 and 66 beneath the bottom and back of the chair respectively. These supports are mounted to the flexible waffle panel 12 which has previously been arched from its original flat condition to the contour shown. The bellows springs 14 are secured to the panel, and covered with a foam pad 38 and a decorative cover sheet 30 which envelopes the springs and panel edge. The panel hinges in the seat area are preferably of heavier construction than in the remaining areas, to provide greater support in this maximum load zone. This prevents lockup from occuring too rapidly, and retains the seat resilience even under heavy load. Also, the bellows springs in the seat area are preferably of thicker wall construction, and perhaps spaced more closely to sustain a greater load for a given deflection. The springs thus provide an initial soft support and cushioning, followed by a second, resilient effect of the panel which deflects smaller amounts under load. The resistive force is never concentrated, therefore, and eliminates tiring "pressure points." These are merely representative of the hundreds of variations conceivable for different items of furniture, mattresses, lounging chairs, or other like structures, while still allowing mass production of the components, and still providing optimum comfort. The bellows springs provide zonal reaction with form fitting. The panel provides definite but selectively-limited resiliency and deflection under load.

Since the bellows exert a cooperative supporting effect, especially when intermeshed, and since the outermost bellows of the cushion structure do not have cooperative bellows on their outer sides, an edge reinforcing band 70 of resilient polymer material may be employed (FIGS. 10 and 11). The girdle band is wrapped around the cushion assembly and intermeshed with the outermost bellows springs. The undulations of this edge reinforcer fit within the grooves of the springs, providing increased resiliency and support for the edge of the article equal to or greater than the support provided by the remainder of the article. Thus, a person sitting on the cushion does not slide off the edge of the chair. Similarly, a person sleeping on a mattress so constructed does not have a feeling of insecurity from the tendency to roll off the edge of the cushion or mattress. This edge reinforcing strip may be formed of a plastic such as a vinyl polymer, or polyethylene, or an equivalent. This band may be formed continuously by extrusion, molding, vacuum forming, mechanical forming, etc. It is wrapped around the article and joined on its ends. Its lower edge can be secured to panel 12 by preforming it with a U shaped leg 74 to extend around the edge of panel 12. This edge reinforcer not only achieves vertical edge support, but also peripherally retains the spring assembly to prevent protrusion of individual springs out of the structure when depressed or titled, and to maintain the springs in their mounted orientation. The degree of intermesh of the band with the springs determines, to a great extent, the firmness of the edge. This firmness also is varied by its thickness and material consistency.

The assembly of FIG. 10 employs only one flexible panel 12 beneath the bellows springs. The springs are overlaid with and secured to a foam pad 38 covered by a decorative sheet 30. The sheet encloses the edges of the article, and preferably is secured around the panel edge. The sheet edge, band edge, and panel edge may be joined by heat sealing, stapling, adhering, stitching 76 and/or any other suitable method.

In one instance it may be desirable to employ flexible support panels on both the upper and lower ends of the springs, while employing the girdle band 70. Such an assembly is illustrated in FIG. 11. Both panels regulate deflection under load before lock-up. If desired, the separation of the panel hinge walls on the upper panel 12a may be greater than that of the lower panel so that under maximum load, the upper panel may assume a greater deflection before lock-up than the lower panel. This will cause the upper panel to decrease the spacing between it and the lower panel, with the springs being compressed a greater amount therebetween for optimum comfort. Attachment of the cover sheet 30 and foam pad 38 is as before.

Figure 13:
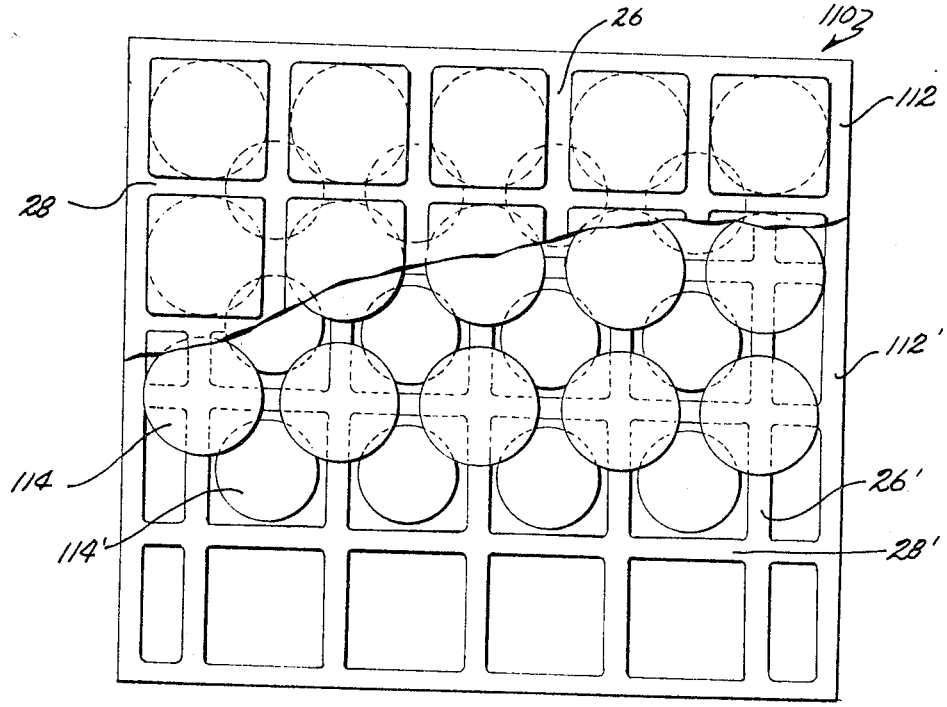
FIG. 13 is a plan view of a modified double panel assembly.
Figure 14:
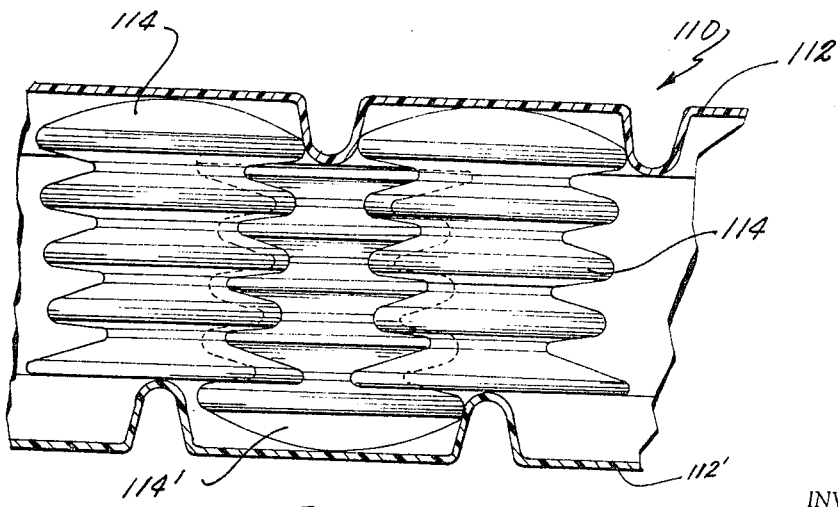
FIG. 14 is a side elevational, sectional view of the assembly in FIG. 13.

Intermeshing of the bellows springs produced important cushioning results, as previously explained. However, with the intermeshed structure illustrated in FIGS. 6 and 7, the caps of the inverted springs are located directly over the intersections of the groove hinges, and may become pinched, dislodged, or otherwise interfere with the panel. Therefore, to achieve intermeshing without this adverse possibility, the assembly may be formed as illustrated in FIGS. 13 and 14. In this assembly 110, one end, preferably the larger diameter end, of each spring, whether upright 114 or inverted 114', is positioned and retained in the pockets of one of the two panels 112 and 112'. The panels have their hinges projecting inwardly with the grooves facing outwardly. Also, the grooves 26 and 26' and 28 and 28' of the two respective panels 112 and 112' are offset with respect to each other, so that the opposite end of each pocketed spring rests on the intersection of the groove crowns of the opposite panel. Thereby no spring rests on an open hinge groove, and moreover, each spring is neatly retained in a pan pocket against tipping. The assembly is secured together and covered in any of the previously illustrated ways, or their equivalent.

One form of the novel assembly may also assume the nature of a cushion as shown in FIG. 15. This cushion 80 is a sandwich formed of a pair of flexible panels 12 and 12' separated, and in effect joined, by the plurality of bellows springs 14. The panels have foam padding 38 and 38' on top and bottom respectively, all encased in a flexible enveloping cover sheet 30' of suitable material.

It will be obvious to those having ordinary skill in the related arts that the novel assembly can be incorporated into a vast variety of load supporting devices, to achieve custom effects in each device, not only in zonal control of resiliency, but also in the ultimate configuration of the article itself. Yet, the stock of materials for the assembly can be mass produced and are ordinarily identical prior to the actual assembly and forming steps to achieve an article with the desired shape and characteristics. Consequently, manufacturing costs, including costs of molds as well as assembly are small in comparison to conventional structures. Hand labor is at a minimum. As previously mentioned, applicant has illustrated only exemplary forms, uses, configurations, and combinations of this invention. Further listings and illustrations of the almost endless variations would be superfluous. The invention involves a unique combination, and is not to be limited to the illustrative structures depicted, but only by the scope of the appended claims, and the reasonably equivalent structures to those defined therein.

We claim:

1. A resilient flexible load support, comprising: a plurality of bellows springs mounted on a support panel; each spring being a column of integrally connected bellows of a resilient polymer and forming a hollow interior chamber vented to the atmosphere; each bellows formed by a pair of outwardly converging legs having an outer juncture forming a resilient hinge biased to an expanded attitude; said bellows capable of being compressed varying amounts under load to flex said hinge, and of returning to the original expanded attitude upon removal of said load due to its inherent resilience, all without significant pneumatic hindrance from air in said spring; a plurality of spaced, generally rigid areas collectively forming a support face of said panel; said springs resting generally on said areas; said areas being separated from each other by intersecting grooves having side walls; the bottoms of said grooves being integral with the walls thereof and forming resilient bendable hinges allowing movement of said areas with respect to each other without distortion of said areas; said hinges being offset from the plane of said rigid areas; said support being bendable as a unit in compound curvature and being resiliently compressible and flexible under load.

2. The article in claim 1 wherein said springs are intermeshed with each other.

3. The article in claim 2 wherein said intermeshing varies over the extent of said panel.

4. The article in claim 2 wherein said springs are intermeshed to varying depths over the extent of said panel.

5. The support in claim 1 wherein each of said springs rests on one of said areas between the intersecting grooves.

6. The support in claim 1 wherein a second panel like said support panel covers the tops of said springs.

7. The support in claim 1 wherein the periphery of said support is wrapped in a girdle band that provides vertical edge support and spring retention.

8. A resilient, flexible load support, comprising: a plurality of bellows springs mounted on a support panel; each spring being a column of intergrally connected bellows of a resilient polymer, and forming a hollow interior chamber vented to the atmosphere; each bellows formed by a pair of outwardly converging legs having an outer juncture forming a resilient hinge biased to an expanded attitude; said bellows capable of being compressed varying amounts under load to flex said hinge, and of returning to the original expanded attitude upon removal of said load due to its inherent resilience, all without significant pneumatic hindrance from air in said spring; a plurality of spaced, generally rigid areas collectively forming a support face of said panel; said springs resting on said areas; said areas being separated from each other by intersecting grooves having side walls; the bottoms of said grooves being integral with the walls thereof and forming resilient bendable hinges allowing movement of said areas with respect to each other without distortion of said areas; said hinges being offset from the plane of said rigid areas; said support being bendable as a unit in compound curvature, and being resiliently compressible under load; and flexible decorative cover means enveloping said springs to cover the exposed ends thereof, and attached to said panel.

9. The support in claim 8 wherein a second panel like said support panel covers the upper ends of said springs and is enveloped by said decorative cover means.

10. The support in claim 8 wherein said grooves and hinges are arranged in at least two groups, and those in each group are in rows parallel to each other.

11. A resilient, flexible load support, comprising: a plurality of bellows springs mounted on a support panel; each spring being a column of integrally connected bellows of a resilient polymer and forming a hollow interior chamber vented to the atmosphere; each bellows formed by a pair of outwardly converging legs having an outer juncture forming a resilient hinge biased to an expanded attitude; said bellows capable of being compressed varying amounts under load to flex said hinge, and of returning to the original expanded attitude upon removal of said load due to its inherent resilience, all without significant pneumatic hindrance from air in said spring; said springs being internested with each other so that the bellows thereof are intermeshed to provide cooperative support action; a plurality of rigid incremental areas forming one face of said panel; said areas being separated from each other by intersecting grooves having side walls and bottoms; the bottoms of said grooves being integral with the side walls thereof and forming resilient bendable hinges allowing movement of said areas with respect to each other without distortion of said areas; said hinges being offset from the plane of said rigid areas; said support being bendable as a unit in compound curvature and being resiliently compressible; an undulated edge reinforcing band around said support and intermeshed with the outermost bellows springs to provide vertical edge support and spring retention; and flexible cover means over said springs.

12. A resilient support, comprising: a pair of flexible support panels and a plurality of hollow, vented, bellows springs; the inside of each spring being hollow and vented to the atmosphere, allowing unhindered air flow in and out; the walls of each spring being formed of a series of integrally joined individual bellows collectively providing the resilient support of the springs; each bellows formed by a pair of outwardly converging legs having an outer juncture forming a resilient hinge biased to an expanded attitude; said bellows capable of being compressed varying amounts under load to flex said hinge, and of returning to the original expanded attitude upon removal of said load due to its inherent resilience, all without significant pneumatic hindrance from air in said spring; each of said panels comprises a plurality of rigid pans interconnected by integral resilient webs forming at their juncture intersecting hinges therebetween; said hinge junctures being offset from the plane of said rigid pans; said hinges in one panel being offset from the hinges in the other panel; each of said springs having one end on one of said pans and the opposite end on the hinge intersections; and the springs being intermeshed with each other to produce a cooperative force transmitting action therebetween.

13. A resilient support as described in claim 12 wherein said springs are arranged in two groups one of which is inverted with respect to the other with the springs of one group being arranged alternately with the springs of the other of said groups.

References Cited by the Examiner

UNITED STATES PATENTS

| | | | |
|---|---|---|---|
| 168,845 | 10/1875 | Pratt | 267—63 |
| 1,648,951 | 11/1927 | Knepper | 5—353 |
| 2,150,747 | 3/1939 | Naulty | 5—348 |
| 2,350,711 | 6/1944 | Amos | 5—348 |
| 2,821,244 | 1/1958 | Beck | 5—361 |
| 2,870,824 | 1/1959 | Le Barre | 5—360 |
| 2,979,739 | 4/1961 | Krakauer | 5—345 |
| 3,116,569 | 1/1964 | Kramer | 29—91.1 |
| 3,125,377 | 3/1964 | Bridges | 297—452 |
| 3,171,691 | 3/1965 | Buehrig | 297—455 |
| 3,201,111 | 8/1965 | Afton | 267—1 |

FOREIGN PATENTS

| | | |
|---|---|---|
| 1,148,718 | 6/1963 | Germany. |

FRANK B. SHERRY, *Primary Examiner.*

C. A. NUNBERG, *Assistant Examiner.*